US012583298B2

(12) United States Patent
Hirano et al.

(10) Patent No.: US 12,583,298 B2
(45) Date of Patent: Mar. 24, 2026

(54) AUTOMOTIVE DOOR

(71) Applicant: HONDA MOTOR CO., LTD., Tokyo (JP)

(72) Inventors: Eiji Hirano, Wako (JP); Masahiro Tanigawa, Wako (JP); Makoto Ono, Tokyo (JP); Shinichi Ozaki, Tokyo (JP); Takeru Sato, Tokyo (JP); Akinari Suzaki, Tokyo (JP); Satoru Kuchiki, Tokyo (JP); Kouya Sugawara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/918,329

(22) Filed: Oct. 17, 2024

(65) Prior Publication Data

US 2025/0128585 A1 Apr. 24, 2025

(30) Foreign Application Priority Data

Oct. 19, 2023 (JP) ................................. 2023-179994

(51) Int. Cl.
B60J 10/75 (2016.01)
B60J 5/04 (2006.01)

(52) U.S. Cl.
CPC ............. B60J 10/75 (2016.02); B60J 5/0426 (2013.01)

(58) Field of Classification Search
None
See application file for complete search history.

(56) References Cited

U.S. PATENT DOCUMENTS

| | | | |
|---|---|---|---|
| 4,662,115 A | 5/1987 | Ohya et al. | |
| 4,923,542 A * | 5/1990 | Janicki | B60J 5/0416 156/289 |
| 5,647,631 A * | 7/1997 | Lee | B60J 5/0481 296/146.5 |
| 5,964,063 A * | 10/1999 | Hisano | E05F 11/488 49/502 |
| 6,086,139 A * | 7/2000 | Heim | B60J 10/80 296/146.5 |
| 6,123,385 A * | 9/2000 | Bailey | B60J 10/75 296/146.7 |
| 6,390,533 B1 * | 5/2002 | Furuse | B60J 5/0468 296/146.5 |
| 7,637,555 B2 * | 12/2009 | Kameoka | B60J 5/0411 49/502 |
| 9,950,595 B2 * | 4/2018 | Hofer | B60J 5/0426 |

(Continued)

FOREIGN PATENT DOCUMENTS

| | | | | |
|---|---|---|---|---|
| DE | 4410983 A1 * | 10/1995 | ............. | B60J 5/0426 |
| DE | 10038200 B4 * | 5/2014 | ............. | B60R 13/02 |

(Continued)

OTHER PUBLICATIONS

Japanese Office Action received in corresponding Japanese application No. 2023-179994 dated Jun. 17, 2025; English translation inlcuded (10 pages).

*Primary Examiner* — Catherine A Kelly

(74) *Attorney, Agent, or Firm* — Rankin, Hill & Clark LLP

(57) ABSTRACT

An automotive door includes: an inner panel made of metal, an outer panel made of resin; and an upper stiffener made of metal and extending along a beltline of the outer panel, wherein the upper stiffener is fixed to the inner panel.

6 Claims, 7 Drawing Sheets

(56)     References Cited

U.S. PATENT DOCUMENTS

| | | | |
|---|---|---|---|
| 10,195,926 B2 * | 2/2019 | Sugie | G01S 7/02 |
| 10,814,802 B2 * | 10/2020 | Migaki | B60R 13/0243 |
| 11,919,372 B2 * | 3/2024 | Carl | B60J 5/0426 |
| 2016/0082813 A1 * | 3/2016 | Hofer | B60J 5/0426 |
| | | | 49/501 |
| 2017/0240029 A1 * | 8/2017 | Moriyama | B60J 5/0431 |
| 2018/0141416 A1 | 5/2018 | Nagaishi et al. | |
| 2019/0160921 A1 * | 5/2019 | Migaki | B60J 5/0469 |
| 2019/0162008 A1 * | 5/2019 | Migaki | B60J 5/0469 |
| 2024/0066961 A1 * | 2/2024 | Choi | B60J 5/0413 |
| 2025/0128579 A1 * | 4/2025 | Hirano | B60J 5/045 |

FOREIGN PATENT DOCUMENTS

| | | | | | |
|---|---|---|---|---|---|
| FR | 2995861 | A1 * | 3/2014 | | B60J 5/0426 |
| GB | 2611779 | A * | 4/2023 | | B60J 10/75 |
| JP | S61-169316 | A | 7/1986 | | |
| JP | S62-189921 | U | 12/1987 | | |
| JP | 2581709 | Y2 | 9/1998 | | |
| JP | 2013-163441 | A | 8/2013 | | |
| JP | 2017-144964 | A | 8/2017 | | |
| WO | 2016/189700 | A1 | 12/2016 | | |

* cited by examiner

34

26a , 26b , 26c , 26d

42

36

Up

Rear ←→ Front

Down

34

26a , 26b , 26c , 26d

38

42

36

40a　40b

Up

Rear ←→ Front

Down

Up
Rear ←→ Front
Down

Up
Rear ←→ Front
Down

AUTOMOTIVE DOOR

CROSS-REFERENCE TO RELATED APPLICATION

This application claims the benefit of priority under 35 U.S.C. § 119 to Japanese Patent Application No. 2023-179994 filed on Oct. 19, 2023, the entire contents of which are incorporated herein by reference.

TECHNICAL FIELD

The present invention relates to an automotive door having a metal inner panel and a resin outer panel.

BACKGROUND OF THE INVENTION

Japanese Utility Model Registration No. 2581709 (hereinbelow, referred to as Patent Document 1), for example, discloses a door structure of an outer beltline reinforcement, extending in a vehicle front-rear direction, welded to an inner surface, facing an interior of the vehicle, of an outer panel of a door.

From another perspective, efforts have been actively made in recent years to provide access to sustainable transportation systems friendly to vulnerable transportation participants, such as the elderly, disabled people, and children. To this end, efforts in research and development have been focused on further improving safety and convenience in transportation through innovations on stiffness of a vehicle body.

SUMMARY

Problems to be Solved

An outer panel of an automotive door may be made of resin. In this case, when an upper skin stiffener (outer beltline reinforcement) is made of metal and fixed by adhesive or the like to the outer panel so as to be relatively non-displaceable, there is a risk of the outer panel being deflected due to difference in amount of thermal expansion between the metal stiffener and the resin outer panel.

In contrast, when the metal upper skin stiffener is coupled by slide nuts or the like to the resin outer panel so as to be relatively displaceable, there is a problem that securing stiffness of the automotive door becomes difficult due to displacement of the upper skin stiffener.

The present invention has been devised in view of the above-identified issues and is intended to provide an automotive door to avoid influence from difference in amount of thermal expansion between the metal stiffener and the resin outer panel, while securing stiffness of the door. This in turn contributes to improving sustainable transportation systems.

Solution to Problems

The present invention provides an automotive door to implement the above-identified objective, and the door includes: an inner panel made of metal, an outer panel made of resin; and an upper stiffener made of metal and extending along a beltline of the outer panel, wherein the upper stiffener is fixed to the inner panel.

Advantageous Effects of the Invention

The present invention provides an automotive door to allow for avoiding influence from difference in amount of thermal expansion between the metal stiffener and the resin outer panel, while securing stiffness of the door.

DETAILED DESCRIPTION

Hereinafter, a description is given in detail of embodiments of the present invention, with reference to the drawings as required.

Figure 1:
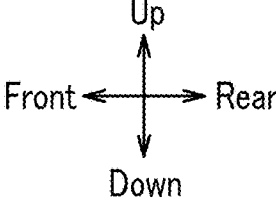
FIG. 1 is a side view of an automotive door according to an embodiment of the present invention, with an outer panel removed therefrom.

As shown in FIG. 1, a door 10 according to an embodiment of the present invention includes a door body 12, and a sash 14 attached to an upper portion of the door body 12. The door body 12 has a resin outer panel 16 (see FIG. 2) on an outer side in a vehicle width direction thereof, and a metal inner panel 18 on an inner side in the vehicle width direction thereof. A door glass 20 is provided between the outer panel 16 and the inner panel 18 (see FIG. 3), so as to be moved up and down in a vehicle up-down direction by a moving mechanism (not shown). The sash 14 has a window opening 22 positioned above a beltline, and the window opening 22 is opened and closed by the door glass 20.

As shown in FIG. 1, the door body 12 is provided at an upper portion thereof with an upper stiffener 24 made of metal and extending in a vehicle front-rear direction along a beltline of the outer panel 16. The upper stiffener 24 is fixed at two points in the vehicle front-rear direction thereof to an upper portion of the inner panel 18, as described below. "Fixing" the upper stiffener 24 includes fixing it so as to be relatively non-displaceable, such as by welding and bonding, but excludes fixing it so as to be relatively displaceable, such as by slide clips.

Figure 2:
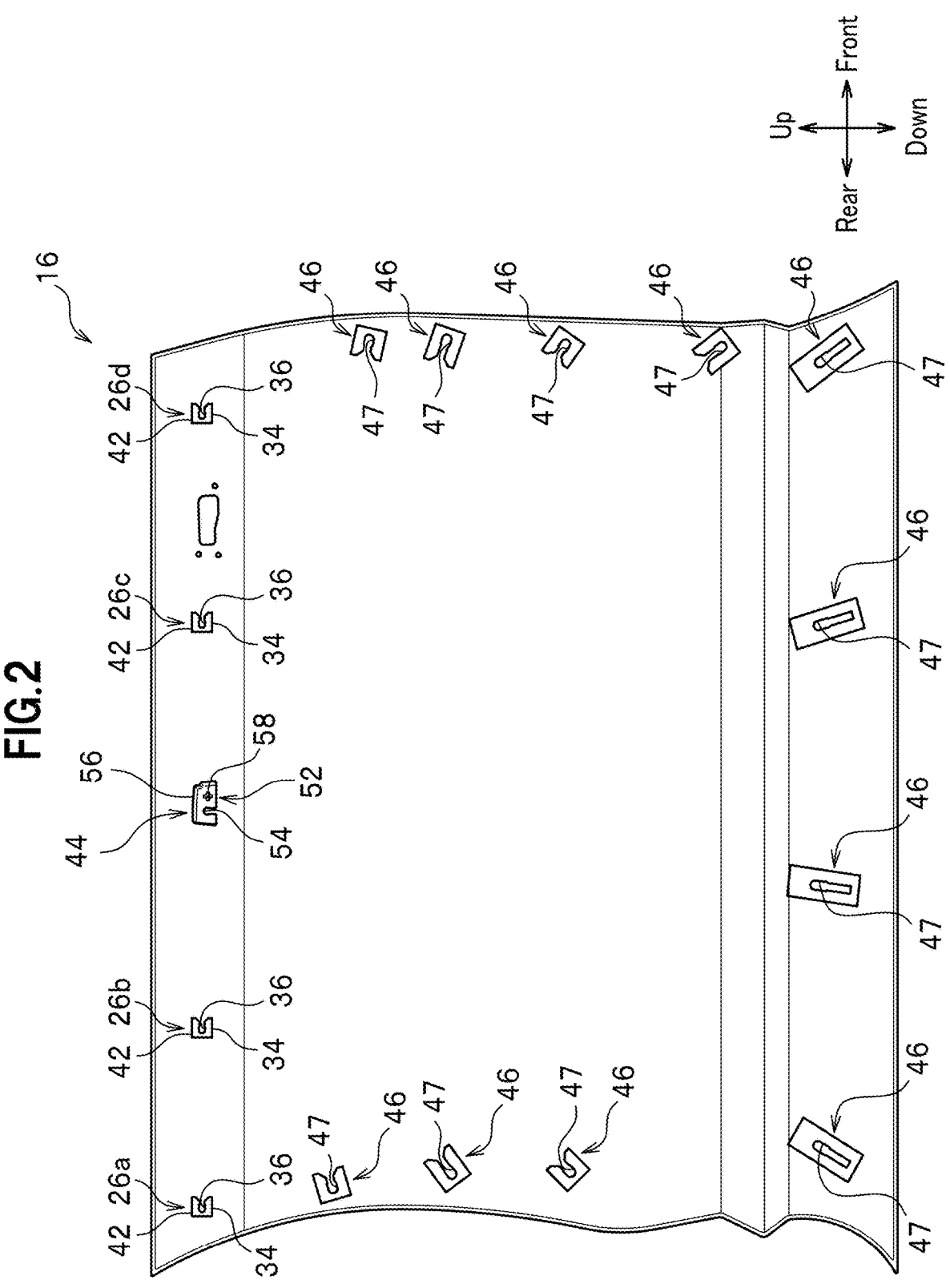
FIG. 2 is a side view of the outer panel to be attached to the door in FIG. 1, as viewed from inside in a vehicle width direction.

As shown in FIG. 2, the outer panel 16 is provided at an upper portion thereof with an upper coupling coupled to the upper stiffener 24 so as to be relatively displaceable. The upper coupling includes a first upper coupling 26a, a second upper coupling 26b, a third upper coupling 26c, and a fourth upper coupling 26d in order from front rearward in the vehicle front-rear direction, along a beltline of the upper stiffener 24.

As shown in FIG. 1, the first upper coupling 26a is provided anterior in the vehicle front-rear direction to a door mirror 28, so as to be relatively displaceable (slidable) only in the vehicle front-rear direction. The second upper coupling 26b is provided posterior in the vehicle front-rear direction to the door mirror 28, so as to be relatively displaceable (slidable) only in the vehicle front-rear direction. The third upper coupling 26c is provided posterior in the vehicle front-rear direction to a center in the vehicle front-rear direction of the upper stiffener 24, so as to be relatively displaceable (slidable) only in the vehicle front-rear direction. The fourth upper coupling 26d is provided posterior in the vehicle front-rear direction to the third upper coupling 26c, so as to be relatively displaceable (slidable) only in the vehicle front-rear direction.

The first to fourth upper couplings 26a to 26d are identical to each other, so that a description is given in detail below of the first upper coupling 26a only, and descriptions of the second to fourth upper couplings 26b to 26d are not given.

In particular, the upper stiffener 24 is provided in an upper portion thereof with a recess 30 in a substantially rectangular shape as viewed laterally (see FIG. 1). The recess 30 is provided in a side wall thereof with a mounting through-hole 32 in a circular shape as viewed laterally. When the outer panel 16 is attached to the upper stiffener 24, the recess 30 is abutted by a clip boss 34 (see FIGS. 4 and 2) provided integrally with, and protruding from a surface of, the outer panel 16. The clip boss 34 has a clip groove 36 extending in the vehicle front-rear direction so as to be horizontally long. A clip 38 is attached to the through-hole 32 of the upper stiffener 24 and the clip groove 36 of the clip boss 34 (see FIGS. 5 and 3), to couple the outer panel 16 with the upper stiffener 24. The outer panel 16 attached to the upper stiffener 24 is slidable in the vehicle front-rear direction, along the clip groove 36.

Figure 3:
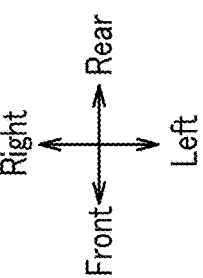
FIG. 3 is a lateral cross-sectional view of the door, including a reference point of the door.
Figure 4:
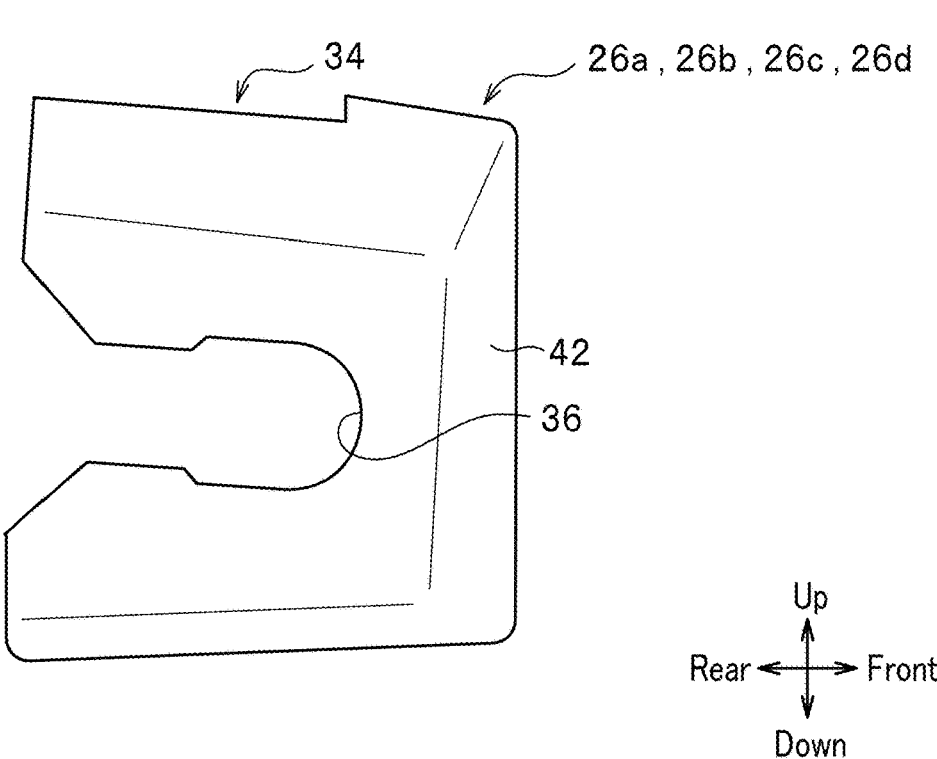
FIG. 4 is an enlarged front view of a clip boss provided at an upper coupling portion of the outer panel.
Figure 5:
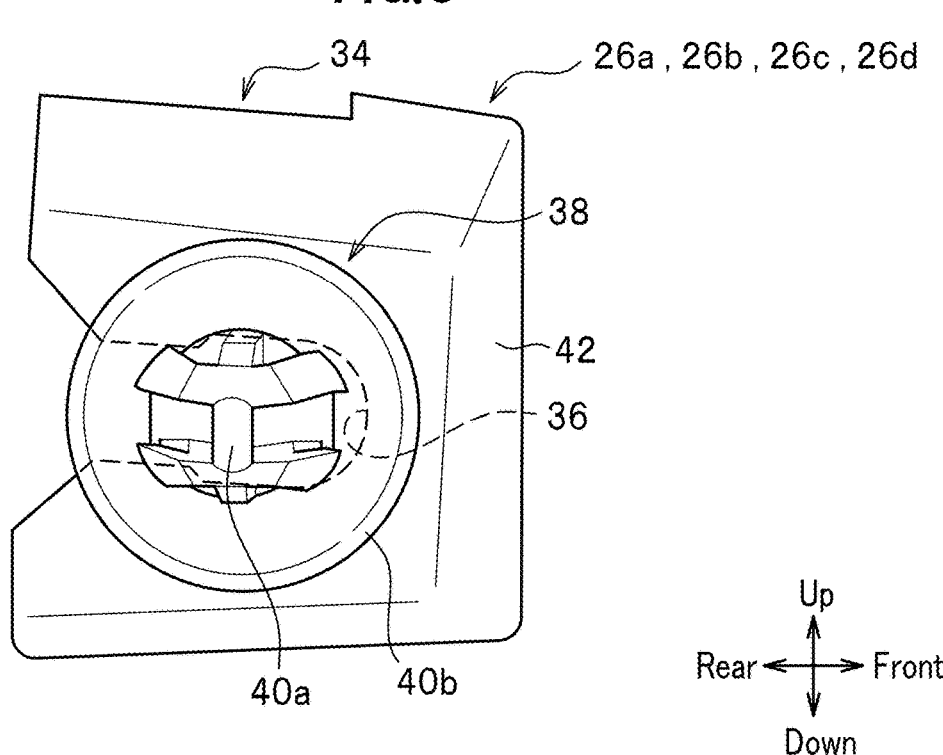
FIG. 5 is an enlarged front view of the clip boss in FIG. 4 having a clip attached thereto.

As shown in FIG. 3, the clip 38 has an elastic portion 40a to be reduced in diameter when inserted into, and passing through, the through-hole 32 and then restored after the passing, an abutting portion 40b to abut against a side wall of the recess 30 of the upper stiffener 24, and an engaged portion 40c to engage with the clip groove 36 of the clip boss 34. As shown in FIG. 4, the clip boss 34 has a clip boss body 42 in a substantially U-shape as laterally viewed and the clip boss body 42 is provided in a top wall thereof with the clip groove 36 opening rearward in the vehicle front-rear direction.

As shown in FIG. 2, the outer panel 16 has a reference point 44 to be fixed to a portion of the upper stiffener 24 so as to be relatively non-displaceable. In addition to the reference point 44, the outer panel 16 has couplings 46 to be coupled to the inner panel 18 so as to be relatively displaceable.

The reference point 44 is provided at a center in the vehicle front-rear direction of the upper stiffener 24 (see FIG. 1). The couplings 46 are arranged below the reference point 44, in the vehicle up-down direction, along a peripheral edge of the upper panel 16. As shown in FIG. 2, the couplings 46 are each provided with a slide groove 47 to allow each to be slid relative to a clip (not shown), and are arranged so as to be slidable in radial directions in which the slide grooves 47 extend with respect to the reference point 44. The couplings 46 are configured with slide nuts, for example, so as to be identical to each other and provided so as to be displaceable (slidable) in radial directions with respect to the reference point 44 by way of the slide grooves 47.

Figure 6:
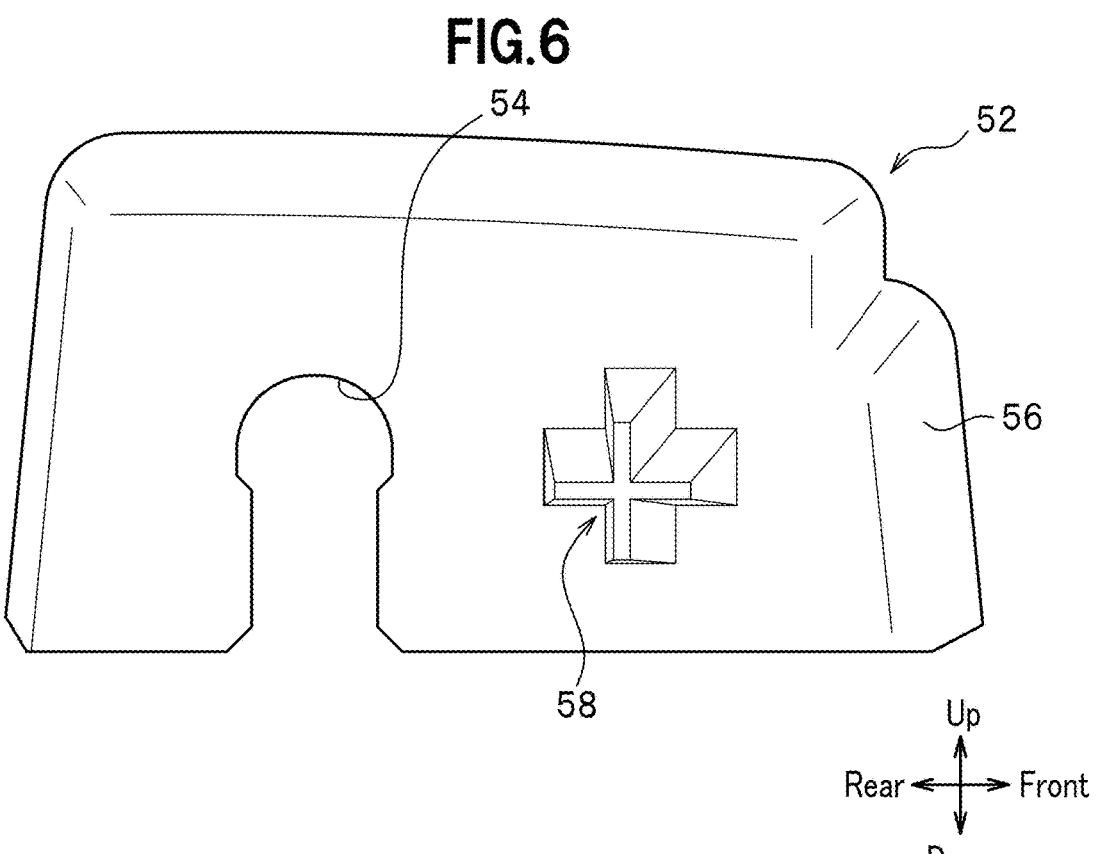
FIG. 6 is an enlarged front view of a clip boss provided at the reference point of the outer panel.
Figure 7:
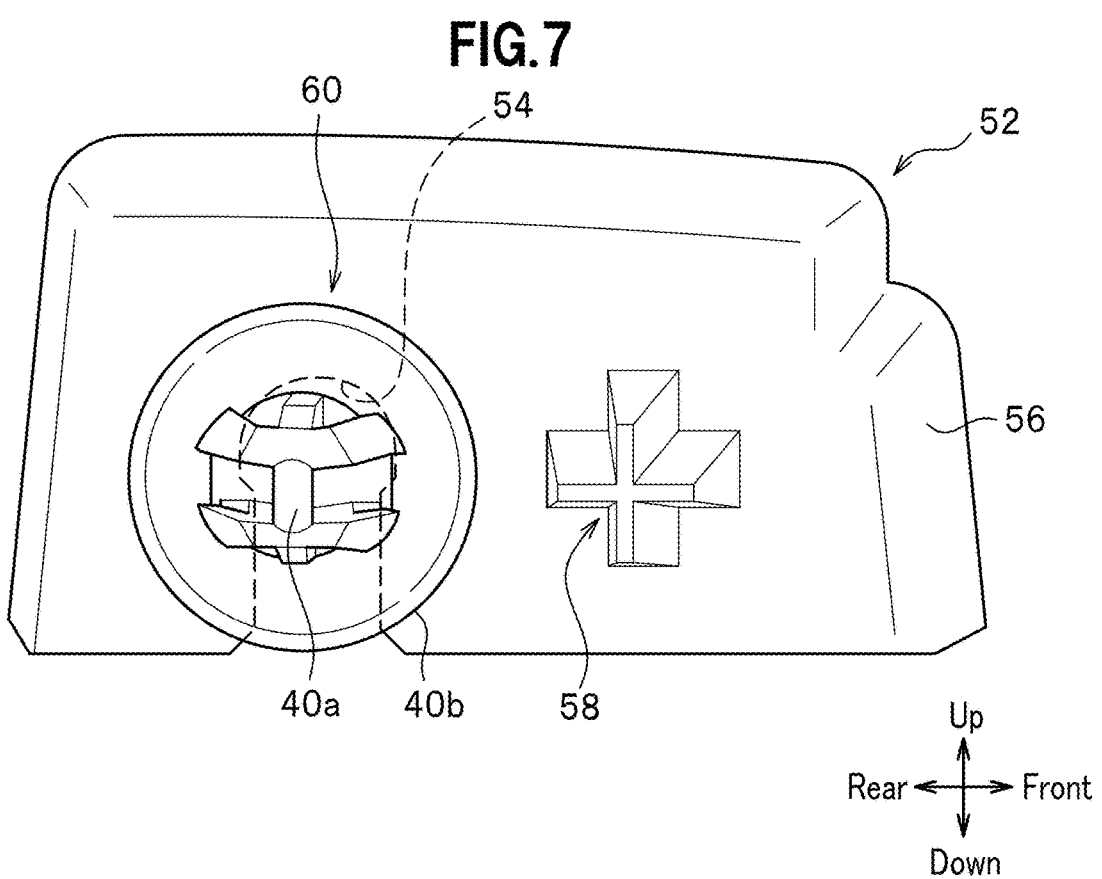
FIG. 7 is an enlarged front view of the clip boss in FIG. 6 having a clip attached thereto.

In particular, the upper stiffener 24 is provided at a center in the vehicle front-rear direction thereof with a recess 48 in a horizontally-long rectangular shape as viewed laterally (see FIG. 1), in which the reference point 44 is seated. The recess 48 is provided with two mounting through-holes 50a, 50b in a circular shape as viewed laterally, side-by-side in the vehicle front-rear direction. When the outer panel 16 is attached to the upper stiffener 24, the recess 48 is abutted by a clip boss 52 in a horizontally-long rectangular shape (see FIG. 3) provided integrally with, and protruding from the surface of, the outer panel 16. The clip boss 52 has a clip groove 54 extending in the vehicle up-down direction so as to be vertically long, and a positioning boss 58 protruding from a surface of a clip boss body 56 (see FIG. 6), side-by-side in the vehicle front-rear direction. The positioning boss 58 has a protrusion having a substantially cross shape in cross-section in a plane normal to its axis, and having a width thereof tapered toward a distal end thereof.

As shown in FIG. 3, the rear though-hole 50b of the upper stiffener 24 has the positioning boss 58 of the clip boss 52 inserted thereinto. While the front though-hole 50a of the upper stiffener 24 has a clip 60 attached thereto (see FIG. 3) to couple the outer panel 16 with the upper stiffener 24. At the reference point 44, the upper stiffener 24 and the outer panel 16 are relatively non-displaceable from each other because the positioning boss 58 is attached into the through-hole 50b (see FIG. 3), even though the outer panel 16 is slidable in the vehicle up-down direction, along the clip groove 54.

The door 10 has the window opening 22 positioned above the beltline, via the sash 14. The upper stiffener 24 is fixed to the inner panel 18 at points anterior and posterior, in the vehicle front-rear direction thereof, to the window opening 22. That is, the upper stiffener 24 is fixed at two points of a front fixing point 62 located anterior to the window opening 22 and door mirror 28, and a rear fixing point 64 located posterior to the window opening 22. A slit 66 is defined between the front fixing point 62 and rear fixing point 64. The door glass 20 is provided so as to be moved up and down in the slit 66 (see FIG. 3).

Figure 8:
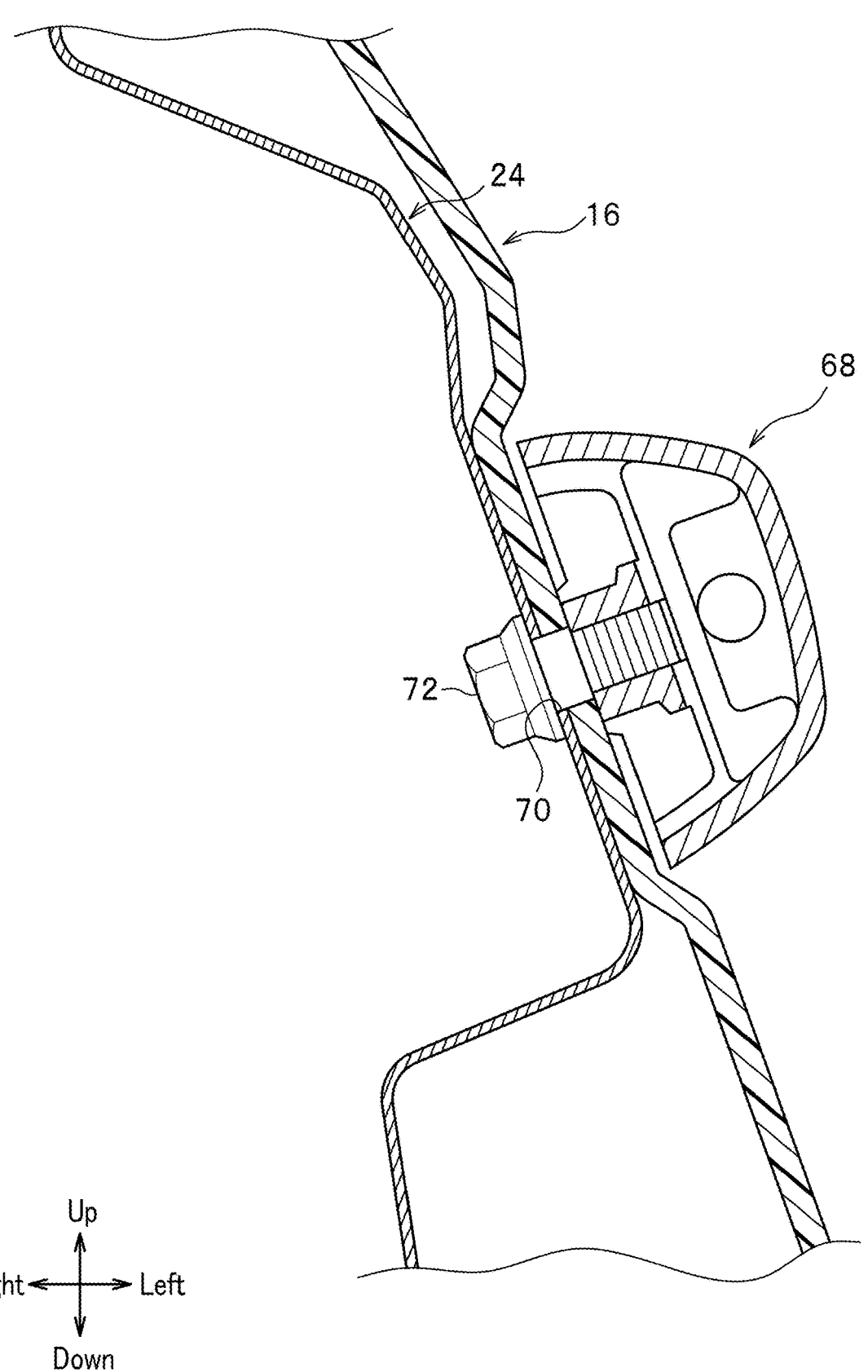
FIG. 8 is a vertical cross-sectional view of an outer handle, taken in a vehicle up-down direction.

In addition, the door 10 has an outer handle 68 extending in the vehicle front-rear direction and exposed on an outer side of the outer panel 16 (see FIG. 1). The outer handle 68 is fastened and fixed to the upper stiffener 24 (see FIG. 8), by a shoulder bolt 72 inserted through a mounting hole 70 formed in the upper stiffener 24.

Figure 9:
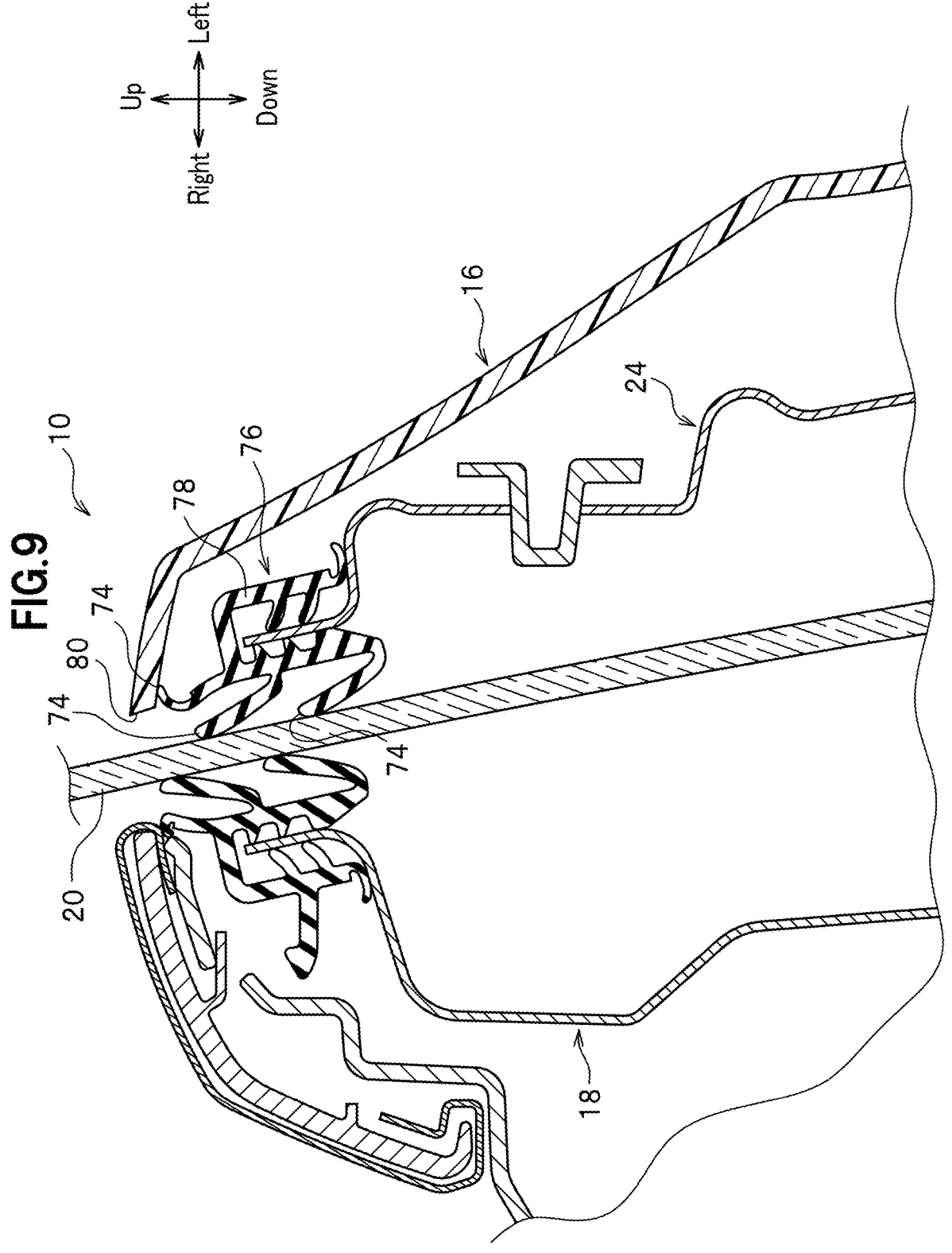
FIG. 9 is a vertical cross-sectional view of moldings and a door glass.

Further, the door 10 includes a molding 76 having glass lips 74 to abut against the door glass 20 (see FIG. 9). The molding 76 is made of an elastic body such as rubber and is attached to an upper end of the upper stiffener 24. The glass lip 74 is flexible and provided so as to be flexed when abutting against a surface of the door glass 20.

The molding 76 has an attached portion 78 in a U-shape in cross section to hold therein the upper end of the upper stiffener 24. The outer panel 16 has an extension 80 extending over the attached portion 78. A distal end of at least a part of the glass lips 74 abuts against a lower end of the extension 80 of the outer panel 16. The glass lips 74 are provided so as to protrude toward the door glass 20 from the attached portion 78.

The door 10 according to the present embodiment is basically configured as described above, and advantageous effects are described below.

The door 10 of the present embodiment includes the upper stiffener 24 made of metal and extending along the beltline of the outer panel 16. The upper stiffener 24 is fixed to the inner panel 18.

According to the present embodiment, the metal upper stiffener 24 is fixed to the metal inner panel 18, to allow for avoiding influence from difference in amount of thermal expansion between itself and the resin outer panel 16, while securing stiffness of the door by itself. In this regard, if the upper stiffener 24 were fixed to the outer panel 16, using a conventional technique as described in Patent Document 1, problems as described above in "Problems to be Solved" would arise when the outer panel 16 is made of resin.

In addition, the outer panel 16 of the present embodiment is at least partly coupled to the upper stiffener 24, via the first to fourth upper couplings 26a to 26d, so as to be relatively displaceable.

This allows the present embodiment to avoid influence from difference in amount of thermal expansion between the outer panel 16 and upper stiffener 24.

Further, the outer panel 16 of the present embodiment has the reference point 44 at which the outer panel 16 is fixed to a portion of the upper stiffener 24 so as to be relatively non-displaceable. The outer panel 16 has the couplings 46 at which the rest of the outer panel 16 other than the reference point 44 is fixed to the inner panel 18 so as to be relatively displaceable.

This allows the reference point 44 to prevent the beltline from being displaced and easily noticed through a door window (window opening 22) from inside and outside of a vehicle compartment. The rest of the outer panel 16 allows difference in amount of thermal expansion between the outer panel 16 and upper stiffener 24, by way of the couplings 46 to couple the outer panel 16 to the inner panel 18 so as to be relatively displaceable.

Still further, the reference point 44 of the present embodiment is provided at the center in the vehicle front-rear direction of the upper stiffener 24. The couplings 46 of the outer panel 16 are arranged below the reference point 44, so as to be slidable in radial directions with respect to the reference point 44.

As a result, the outer panel 16 of the present embodiment, made of resin, has the center of the beltline, where displacement is most likely noticed, positioned at the reference point 44, and has the rest thereof other than the reference point 44 held radially slidable via the couplings 46, to allow for making displacement thereof less noticeable while minimizing flexure thereof. Besides, as being positioned at the reference point 44 in the center of the beltline, the outer panel 16 made of resin is evenly stretched by heat in the vehicle front-rear direction, to have even widths of gaps anterior and posterior to the door 10.

Still further, the door 10 of the present embodiment has the outer handle 68. The outer handle 68 is fixed to the upper stiffener 24 by the shoulder bolt 72.

As a result, the door 10 of the present embodiment has the outer handle 68 directly fixed to the upper stiffener 24, to allow for increasing stiffness of the outer handle 68 being attached to the door 10. Besides, as the outer handle 68 of the present embodiment is fixed by means of the upper stiffener 24, no handle bracket is separately required, so that the parts are reduced in number.

Still further, the door 10 of the present embodiment has the window opening 22 positioned above the beltline. The upper stiffener 24 is fixed to the inner panel 18 at points anterior and posterior, in the vehicle front-rear direction thereof, to the window opening 22.

As a result, the door 10 of the present embodiment has the upper stiffener 24 extending from a point anterior to the window opening 22 to a point posterior to the window opening 22 and fixed to the inner panel 18, to improve stiffness thereof. That is, the upper stiffener 24 is fixed at two points of the front fixing point 62 located anterior to the window opening 22 and door mirror 28 and the rear fixing point 64 located posterior to the window opening 22.

Still further, the door 10 of the present embodiment includes the door glass 20 to be moved up and down and the molding 76 having the glass lips 74 to abut against the door glass 20. The molding 76 is attached to the upper end of the upper stiffener 24.

As a result of the molding 76 being attached to the upper stiffener 24, which is fixed to the inner panel 18, the door 10 of the present embodiment allows the glass lips 74 to abut against the door glass 20, without influence from thermal expansion of the resin outer panel 16. The door 10 of the present embodiment also allows for improving accuracy of the position where the molding 76 is attached, to secure performance of holding the door glass 20 in place, so that performance of the glass lips 74 wiping up water on the door glass 20 and performance of the door glass 20 shielding sound are secured. Besides, the molding 76 being directly attached to the upper stiffener 24 improves stiffness of the molding 76 being held, which in turn improves performance of wiping up water on the door glass 20 and performance of the door glass 20 shielding sound.

Still further, the molding 76 of the present embodiment has the attached portion 78 in a U-shape in cross section to hold therein the upper end of the upper stiffener 24. The outer panel 16 has the extension 80 extending over the attached portion 78 of the molding 76.

As a result, the door 10 of the present embodiment has the molding 76 covered by the extension 80 of the outer panel 16, to improve appearance of the door 10.

LIST OF REFERENCE SIGNS 10, door; 16, outer panel; 18, inner panel; 20, door glass; 22, door opening; 24, upper stiffener; 26a to 26d, upper couplings; 44, reference point; 46, coupling; 62, front fixing point; 64, rear fixing point; 74, glass lip; 76, molding; and 78, attached portion.

What is claimed is:

1. An automotive door comprising:
an inner panel made of metal;
an outer panel made of resin; and
an upper stiffener made of metal and extending along a beltline of the outer panel,
wherein the upper stiffener is fixed to the inner panel,
the outer panel has a reference point at which the outer panel is fixed to a portion of the upper stiffener so as to be relatively non-displaceable,
the outer panel has couplings at which rest of the outer panel other than the reference point is fixed to the inner panel so as to be relatively displaceable,
the reference point is provided at a center in a vehicle front-rear direction of the upper stiffener, and
the couplings are arranged below the reference point, so as to be slidable in radial directions with respect to the reference point.

2. The automotive door according to claim 1, wherein the outer panel is at least partly coupled to the upper stiffener, so as to be relatively displaceable.

3. The automotive door according to claim 1, further comprising:
an outer handle,
wherein the outer handle is fixed to the upper stiffener.

4. The automotive door according to claim 1, further comprising:
a window opening positioned above the beltline,
wherein the upper stiffener is fixed to the inner panel at points anterior and posterior, in the vehicle front-rear direction thereof, to the window opening.

5. The automotive door according to claim 1, further comprising:

a door glass to be moved up and down; and a molding having glass lips to abut against the door glass, wherein the molding is attached to the upper stiffener.

6. The automotive door according to claim 5, wherein the molding has an attached portion in a U-shape in cross section to hold therein an upper end of the upper stiffener, and the outer panel extends over the attached portion.

* * * * *